United States Patent Office 3,406,029
Patented Oct. 15, 1968

3,406,029
PLASTIC CHROME ORE COMPOSITION
Grant M. Farrington, Marlton, N.J., and Wayne X. Fay, Villanova, Pa., assignors to General Refractories Company, Philadelphia, Pa., a corporation of Pennsylvania
No Drawing. Filed June 22, 1966, Ser. No. 559,421
9 Claims. (Cl. 106—66)

ABSTRACT OF THE DISCLOSURE

A plastic, soluble silicate-bonded, chrome ore refractory mix is prepared containing with the chrome ore coarse and chrome ore fines, soluble silicate binder and water, from about 5 to about 15%, by weight, of chrome ore, alumina or mixtures thereof having a particle size less than 8 microns as plasticizer in place of the usual plastic clay plasticizer.

---

The present invention relates to a plastic chrome ore refractory mix and to its preparation; and, more particularly, the present invention relates to a plastic chrome ore refractory mix possessing improved properties, especially increased refractoriness and dried strength, as compared to such mixes heretofore available.

Plastic chrome ore refractory mixes, as well known to those skilled in the art, are compositions comprising a base of ground chrome ore to which is added a plasticizer, to render the material moldable, and a bonding agent, to provide in the material a strong hard set upon drying. Such a mix is used as, for example, a lining material for open hearth doors, furnace walls and bottoms, for tamping around and between the tubes in stud-tube boilers, and the like. In its manufacture and handling, the final mix, including the required amount of water to provide the desired workability, is prepared and placed in closed containers where it remains during storage, shipment and further storage prior to use. In its application, the mix is removed from the container; forced into place by ramming, tamping or vibrating and dried, and finally fired, in place, into a strong ceramic structure by the heat of the furnace itself.

The bonding agent normally employed is a water-soluble silicate, especially an alkali metal silicate, like sodium silicate or potassium silicate. Since a moist mixture of chrome ore and soluble silicate has very poor molding properties in that it would crumble and fall apart during installation, a plasticizer is included to give the mix body and to render it moldable. The plasticizer normally used heretofore in such mixes is a plastic clay, like kaolin or bentonite, especially the latter (see U.S. Patent No. 2,792,311). Although such a clay imparts good moldability, there are many disadvantages in its use, even when added in amounts as small as 1 to 2% by weight of the mix.

Bentonite, when wet with water, increases in volume up to 12–15 times, and, upon drying, shrinks to its original volume. When employed as plasticizer in a plastic chrome ore refractory mix, these characteristics are transferred to the mix, resulting in: (1) excessive water is required to provide the desired consistency and this water is held tenaciously, increasing the drying and curing time of the mix: and (2) the dried strength of the mix is reduced. More serious, however, is the fact that the addition of bentonite results in a reduction in the refractoriness of the mix, and this sacrifice of refractoriness for desired plasticity through the use of bentonite is well recognized in the art as will be seen from the above-mentioned patent. Furthermore, the workability of a plastic chrome ore mix containing bentonite deteriorates upon standing, even in a closed container, due, it is believed, to a reaction between the bentonite and the sodium or potassium silicate. This latter condition is said to be overcome, according to U.S. Patent No. 2,792,311, by including ethylene diamine tetraacetic acid in the mix.

A principal object of the present invention is to provide an improved plastic chrome ore refractory mix.

Another object of the invention is to provide a plastic chrome ore refractory mix possessing a combination of good plasticity and improved refractoriness as compared to mixes heretofore available.

Still another object of the present invention is to provide a plastic chrome ore refractory mix in which the amount of water required for a given workability, and hence the drying and curing time, is less than in mixes heretofore available.

A still further object of the invention is to provide a plastic chrome ore refractory mix of improved dried strength.

Still another object of the present invention is to provide a plastic chrome ore refractory mix having improved shelf life in that deterioration of workability upon standing in a closed container is markedly reduced.

An important object of the present invention is to provide the foregoing improvements in a plastic chrome ore refractory mix without sacrificing plasticity.

Other objects, including a method of making the improved plastic chrome ore refractory mix, will become apparent from a consideration of the specification and claims.

The foregoing objects are achieved, according to the present invention, by providing in a plastic chrome ore refractory mix a minor proportion of extremely fine chrome ore itself or extremely fine alumina and omitting the usual clay plasticizing agent. The extremely fine chrome ore and alumina having a particle size less than 8 microns, will be present in an amount of at least 5%, by weight, based on the total dry weight of the mix.

The novel plastic chrome ore refractory mix of the present invention, therefore, consists essentially of (A) a preponderant proportion of ground chrome ore; (B) a small, dry-bonding amount of a water-soluble silicate; and (C) a small, plasticizing amount of chrome ore and/or alumina having a particle size less than 8 microns.

The extremely fine chrome ore or alumina, described above, has been found to impart to a plastic chrome ore refractory mix a plasticity or body very similar to that imparted by the addition of bentonite. However, with the extremely fine chrome ore or alumina, there is no reduction in refractoriness, as is the case with the use of bentonite. Moreover, substituting the extremely fine chrome ore or alumina for bentonite increases the dried strength, instead of reducing it as does bentonite. Furthermore, with the extremely fine chrome ore or alumina as plasticizer in place of bentonite, it has been found that less water is required for a given mix workability and that what water is present is less tenaciously held, so that shorter drying and curing times are required. In addition, there has been found to be less deterioration of workability upon storage when the extremely fine chrome ore or alumina is used as the plasticizer. It will be seen, therefore, that the present invention provides a plastic chrome ore refractory mix of improved properties, especially in refractoriness and dried strength, without sacrificing plasticity; or, to put it another way, the present invention provides a plastic chrome ore refractory mix of the required plasticity without sacrificing (and indeed while improving) other important properties.

As is the case with conventional plastic chrome ore refractory mixes, the base of the present composition will be ground chrome ore. Chrome ore from different sources may be used, either alone, or in admixture. The following are typical, but not limiting, chemical analyses:

| Chrome ore | A | B | C | D |
|---|---|---|---|---|
| SiO$_2$ | 5.0 | 4.3 | 9.4 | 0.6 |
| FeO | 13.6 | 26.5 | 15.2 | 26.9 |
| Al$_2$O$_3$ | 29.5 | 17.7 | 15.7 | 15.6 |
| CaO | .5 | .5 | .2 | .2 |
| MgO | 18.1 | 10.4 | 18.1 | 9.8 |
| Cr$_2$O$_3$ | 33.3 | 40.6 | 41.4 | 46.9 |

The ore may simply be ground to the usual grain size distribution before mixing with the other materials, or it may be added in lump form to the other materials and ground while being mixed, as in a wet pan. In either event, the chrome ore base will be of a particle size distribution such that at least 85% thereof passes through a 3 mesh screen (Tyler). A mixture of "coarses" and of "fines" is preferably used. Generally from about 35 to about 55%, by weight, of the chrome ore base will be "coarse," that is on 28 mesh, and from about 45 to about 65% will be "fines," that is through 28 mesh. A typical "coarse" material is, for example, max. 10% on 3 mesh; min. 8% on 4 mesh; max. 95% on 14 mesh, and min. 90% on 20 mesh. A typical "fines" material is, for example, max. 0.5% on 28 mesh; max. 10% on 48 mesh; min. 2.5% on 65 mesh, and min. 40% to max. 60% through 200 mesh. Conventionally ground, size graded chrome ore used in making prior plastic chrome ore mixes to which bentonite has been added to impart the requisite plasticity may contain a very small amount of 8 micron size material; less than 3%. This amount, however, by itself is insufficient to provide plasticity, and, while it may provide a portion of the total extremely fine material in the composition of the present invention, further extremely fine chrome ore and/or alumina must be added to provide the required plasticity. For the purposes of the present invention, any chrome ore having a particle size less than 8 microns provided by the chrome ore base will be considered part of the extremely fine component. Thus where reference is made hereinafter to the chrome ore base it will be understood to mean, that material having a particle size greater than 8 microns.

The chrome ore base, as stated, will make up the preponderant proportion of the mix, and generally the proportion of chrome ore base will be between about 80 and about 93%, preferably between about 85 and about 90%, by weight, based on the dry weight of the mix.

The extremely fine chrome ore content may be any of the chrome ores, and need not be the same as that used for the base. The important factor as far as this component—or the extremely fine alumina component—is concerned is its particle size. It must be extremely fine, being less than 8 microns in size. It will be seen that this particle size is an entirely different order of magnitude from that of the chrome ore base. Such extremely fine chrome ore and alumina can readily be made by attrition grinding. To impart the desired plasticity, which may vary somewhat depending mainly upon the particular application, there should be at least about 5%, by weight, based on the total weight of the dry mix, of the stated extremely fine material—chrome ore and/or alumina—present. Preferably the content of extremely fine material is at least about 7%. Generally, the extremely fine chrome ore and/or alumina component will not exceed about 15%, and preferably will not exceed about 12%, by weight, of the dry weight of the mix.

As between the extremely fine chrome ore and the extremely fine alumina, the former is especially preferred.

In accordance with conventional practice, a water-soluble silicate bonding agent is included in the mix. Suitable silicates in this regard include the water-soluble alkali metal silicates, particularly sodium silicate and potassium silicate. Sodium silicate is presently preferred. The silicate may be added in dry, powdered form or as an aqueous solution. In this connection, a particularly advantageous silicate bonding agent is a 47%, by weight, solution of sodium silicate (Na$_2$O:SiO$_2$ ratio of 1:2.4) in water. Other well known water-soluble silicates may be used, including those alkali metal silicates in which the alkali oxide:silica ratios differ from that of the example given above, for example, from 1:1 to 1:3.75. Any water imparted to the mix by the silicate, when a solution is used, will be taken into account in arriving at the total water content of the mix to achieve the desired workability. The silicate is included in the mix to serve as a preliminary binder to provide dry strength, and for this purpose only a small proportion is required in accordance with conventional practice. Generally, the silicate (calculated as water-free material) will make up between about 2 and about 6%, preferably between about 3 and about 5%, by weight, of the dry weight of the mix.

Also, in accordance with conventional practice, a small amount of water will be added to the mix to provide the desired workability, either by the manufacturer or by the user prior to use. In general, the total water content may range between about 5 and about 10%, by weight, based upon the dry weight of the mix. The foregoing figures include any water associated with the batch ingredients as, for example, when an aqueous silicate solution is used.

Reference has been made above to the present composition as consisting essentially of the positively recited materials. This is not to be taken as excluding minor amounts of other materials which do not detract appreciably from the improvements achieved through the use of the extremely fine chrome ore and/or alumina as plasticizer in accordance with the present invention.

The procedural steps employed in making the plastic chrome ore refractory mix of the present invention need not depart from conventional practice except, of course, that the extremely fine chrome ore or alumina is used as plasticizer. The chrome ore base may be ground prior to mixing with the other materials, or it may be ground in the presence of the other materials during mixing as by adding lump chrome ore to the other materials in a wet pan. The alumina and the added extremely fine chrome ore and silicate if used in dry form, will be in their ultimate extremely finely-divided form prior to mixing.

The following examples are given for the purpose of illustration only, and are not intended to limit the scope of the invention in any way.

Examples 1–4

In these examples, the chrome ore base is a Phillipine chrome ore having a chemical analysis corresponding to ore A in the table of chrome ore chemical analyses given hereinabove, and the added extremely fine chrome ore is a Transvaal chrome ore washed concentrate having a chemical analysis corresponding to ore D in that table. The chrome ore base is made up of two grades: a "coarse," making up about 45%, through 3 mesh (Tyler) and on 20 mesh; and a "fines," making up about 55%, through 50 mesh (about half of the "fines" is through 200 mesh). There is associated with the chrome ore base about 2.3% chrome ore particles having a particle size less than 8 microns. This material is included in the extremely fine component and excluded from the chrome ore base in the following table. The added extremely fine chrome ore has a mean particle size of 3.5 microns and is substantially entirely less than 8 microns in size. The amounts of water used are adjusted to give essentially the same initial workability for each mix.

The materials set forth in the table are mixed in the stated proportions. A portion of each sample is hand-molded into truncated pyramids for measurement of refractoriness at 2912° F.; another portion is hand-molded into bars for measuring dried strength (modulus of rupture according to ASTM C133–55, modified to use 9" x 2" x 2" bars), and the remainder is stored in a closed container. Drying is done at 230° F. for 24 hours.

The results are tabulated as follows, in which proportions of materials are given in parts, by weight:

| Examples | 1 | 2 | 3 | 4 |
|---|---|---|---|---|
| Chrome ore base | 92.2 | 91.1 | 90.1 | 88.1 |
| Sodium silicate (dry basis)* | 4.4 | 4.4 | 4.4 | 4.4 |
| Bentonite | 1.1 | 2.2 | 0 | 0 |
| Extremely fine chrome ore: | | | | |
| Added as such | 0 | 0 | 3.2 | 5.2 |
| From fines in chrome ore base | 2.3 | 2.3 | 2.3 | 2.3 |
| Total water (percent by weight, based on total wet mix) | 8.1 | 8.6 | 7.1 | 6.9 |
| From silicate solution | 5.4 | 5.4 | 5.4 | 5.4 |
| Added as such | 2.7 | 3.2 | 1.7 | 1.5 |
| Refractoriness (percent slump) | 9.68 | 13.74 | 7.07 | 5.86 |
| Dried strength, MOR (p.s.i.) | 1,306 | 1,358 | 1,542 | 1,966 |
| Workability (ASTM C 181–47) after 3 months storage | 14.1 | 11.4 | 19.9 | 21.0 |

*Added as a 47%, by weight, aqueous solution; $Na_2O:SiO_2 = 1:2.4$.

After standing one week in sealed containers, Example 2 mix is found to have the best plasticity of the clay-bearing mixes. The mixes of Examples 3 and 4 are very soft and plastic.

After standing a total of two weeks, the mix of Example 4 has a plasticity comparable to that of the mix of Example 2. The mixes of Examples 1 and 3 lack the fat body of the mix of Example 2 but maintain good texture.

The mix of Example 1 is the standard prior art mix. While the mix of Example 2 gives better plasticity than that of Example 1, it also causes greater deterioration in other properties. The foregoing shows that the present invention can provide a plasticity comparable even to that of the mix of Example 2 without the stated deterioration. Thus, comparing the mix of Example 4 with that of Example 2 shows the following improvements for the former:

| | Percent |
|---|---|
| Refractoriness | 235 |
| Water required to reach equivalent plasticity | 21 |
| Dried strength | 145 |

Comparable results are obtained when potassium silicate is substituted for the sodium silicate.

The foregoing shows that, with the extremely fine chrome ore, plasticity can be adjusted, by increasing the amount of the extremely fine chrome ore, without sacrificing other desirable properties, such as refractoriness and strength, as is the case with bentonite. Moreover, the total water requirements are lower when using extremely fine chrome ore as plasticizers as compared to the use of bentonite.

Examples 5 and 6

In these examples, the procedure of Examples 1–4 is followed except that extremely fine alumina is added in place of the added extremely fine chrome ore. The alumina is nominally 99%—325 mesh, and about 100% thereof has a particle size of 8 microns or less when examined microscopically.

The results are tabulated as follows:

| Example | 5 | 6 |
|---|---|---|
| Chrome ore base | 92.4 | 90.4 |
| Sodium silicate (dry basis)* | 4.4 | 4.4 |
| Extremely fine alumina | 3.2 | 5.2 |
| Extremely fine chrome ore from fines in chrome ore base | 2.3 | 2.3 |
| Total water (percent, by weight, based on total wet mix) | 7.6 | 7.0 |
| From silicate solution | 5.4 | 5.4 |
| Added as such | 2.2 | 1.6 |
| Refractoriness (percent slump) | 8.54 | 8.09 |
| Dried strength, MOR (p.s.i.) | 1,511 | 1,600 |

*See footnote, preceding table.

Modification is possible in the selection of the various materials and amounts thereof as well as in the techniques employer in preparing the mix without departing from the scope of the present invention.

What is claimed is:

1. A plastic chrome ore refractory mix consisting essentially of (A) a preponderant proportion of chrome ore base from about 35 to about 55%, by weight, of which has a particle size of +28 mesh and from about 45 to about 65% of which has a particle size of −28 mesh; (B) a small, dry-bonding amount of a water-soluble silicate; (C) a small plasticizing amount of extremely fine material selected from the group consisting of chrome ore, alumina and mixtures thereof having a particle size less than 8 microns, and (D) water, said silicate being present in an amount between about 2 and about 6%, calculated as water-free material, said extremely fine material being present in an amount between about 5 and about 15%, and said water being present in an amount between about 5 and about 10%, said amounts being by weight and based on the dry weight of the mix.

2. The plastic chrome ore refractory mix of claim 1 wherein the extremely fine material is present in an amount less than about 12%.

3. The plastic chrome ore refractory mix of claim 1 wherein said extremely fine material is chrome ore.

4. The plastic chrome ore refractory mix of claim 3 wherein said extremely fine chrome ore is present in an amount between about 7 and about 12%.

5. The plastic chrome ore refractory mix of claim 1 wherein said chrome ore base has a particle size less than 3 mesh and greater than 8 microns and is present in an amount between about 80 and about 93%, by weight, based on the dry weight of the mix, and wherein the extremely fine material is chrome ore.

6. The plastic chrome ore refractory mix of claim 5 wherein the chrome ore base is present in an amount between about 85 and about 90%, and wherein the extremely fine chrome ore is present in an amount between about 7 and about 12%.

7. The plastic chrome ore refractory mix of claim 1 wherein the water-soluble silicate is sodium silicate and is present in an amount between about 3 and about 5%, calculated as water-free material, by weight, based on the dry weight of the mix.

8. The plastic chrome ore refractory mix of claim 5 wherein said water-soluble silicate is sodium silicate.

9. The plastic chrome ore refractory mix of claim 8 wherein said sodium silicate is present in an amount between about 3 and about 5%, and wherein said extremely fine chrome ore is present in an amount between about 7 and about 12%.

References Cited

UNITED STATES PATENTS 3,208,862   9/1965   Davies et al. _____ 106—66
3,278,320   10/1966  Neely et al. _____ 106—66

JAMES E. POER, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,406,029                        October 15, 1968

Grant M. Farrington et al.

It is certified that error appears in the above identified patent and that said Letters Patent are hereby corrected as shown below:

Column 2, line 25, "or" should read -- ore --. Column 5, line 15, "$Na_2O=SiO_2=1=2.4$" should read -- $Na_2O:SiO_2=1:2.4$ --. Column 6, line 3, "employer" should read -- employed --.

Signed and sealed this 3rd day of March 1970.

(SEAL)
Attest:

Edward M. Fletcher, Jr.                    WILLIAM E. SCHUYLER, JR.
Attesting Officer                          Commissioner of Patents